June 21, 1960 J. REYES 2,941,681
AUTOMATIC FILLING AND DUMPING DEVICE
Filed Feb. 19, 1959 2 Sheets-Sheet 1

INVENTOR.
JOSÉ REYES
BY
ATTORNEY

June 21, 1960     J. REYES     2,941,681
AUTOMATIC FILLING AND DUMPING DEVICE
Filed Feb. 19, 1959     2 Sheets-Sheet 2
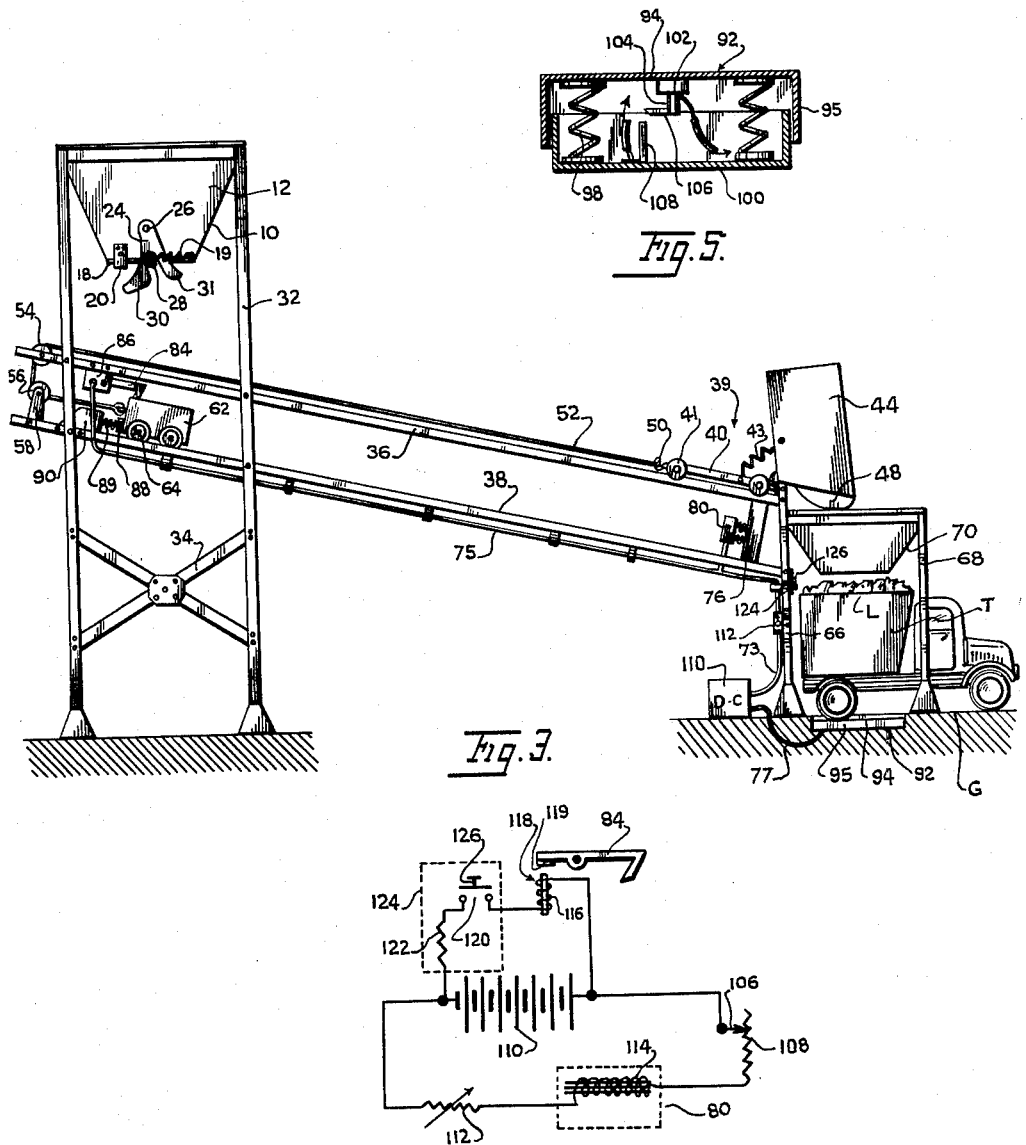
INVENTOR.
JOSÉ REYES
ATTORNEY

United States Patent Office 2,941,681
Patented June 21, 1960

2,941,681

AUTOMATIC FILLING AND DUMPING DEVICE

José Reyes, 1591 Fulton Ave., Bronx, N.Y.

Filed Feb. 19, 1959, Ser. No. 794,426

7 Claims. (Cl. 214—99)

This invention relates to the art of conveyors and particularly concerns a loading apparatus suitable for conveying coal, ore and the like from a bin or hopper to a loading station for filling a car, truck, etc.

A principal object of the invention is to provide automatic means discharging the material to be loaded into a carriage and for unloading the carriage into a waiting vehicle.

A further object is to provide control means whereby the amount of material discharged into the carriage depends on the carrying capacity of the vehicle to be loaded with the material.

A still further object is to provide means whereby the carriage is movable to the pin for loading only when a vehicle is waiting to receive the material from the carriage.

Another object is to provide magnetic means to supplement gravitational means for restraining movement of a counterweight to the carriage depending on the amount of material to be loaded into the carriage.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is a side elevational view of the apparatus at one stage in the operation thereof.

Fig. 4 is an electrical diagram of a circuit employed in the apparatus.

Fig. 5 is a cross-sectional view of a loading platform employed in the apparatus.

Figure 2:
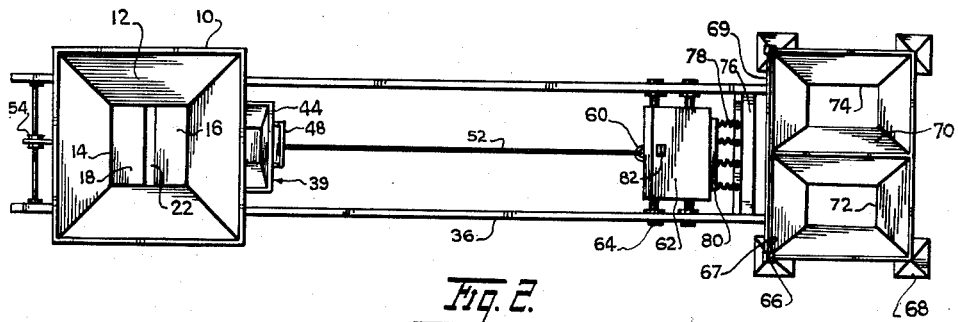
Fig. 2 is a top plan view of the apparatus of Fig. 1.
Figure 1:
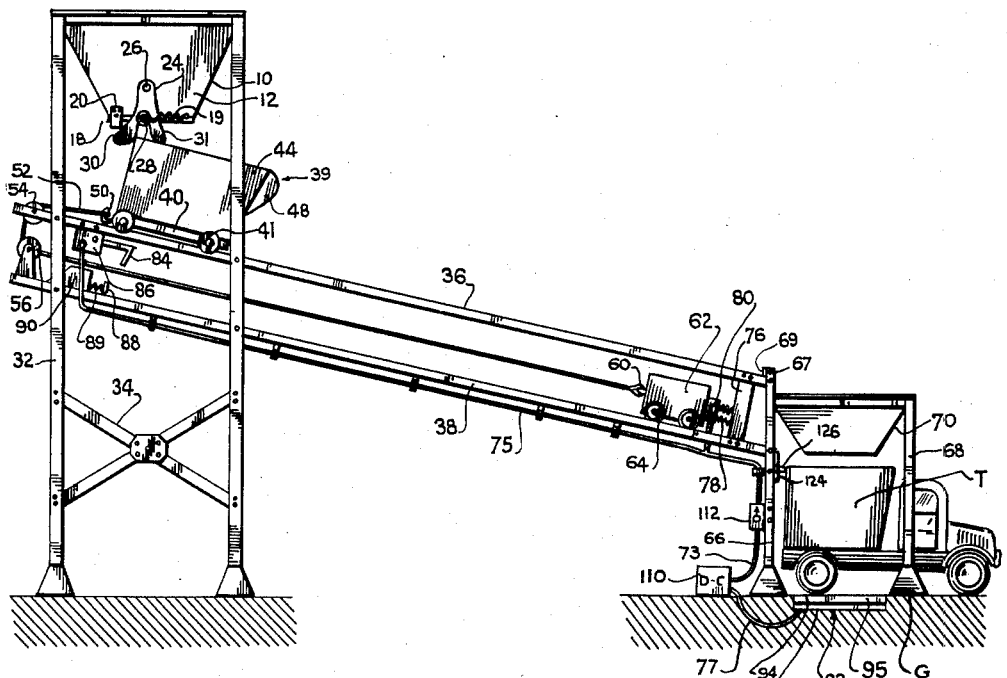
Fig. 1 is a side elevational view of the apparatus embodying the invention.

Referring to Figs. 1–3, there is shown a bin 10 having sides 12 tapering down to a rectangular floor 14. The floor includes a stationary panel 16 and a movable panel 18 carried on a bracket 20. Panel 18 is slidable toward and away from panel 16 to close and open a material discharge opening 22. Panel 18 is movable by springs 19 and by means of bifurcated levers 24 pivotally carried by pins 26 mounted on the sides of the bin. Pins 28 extend out from the lateral edges of panel 18 to engage between the bifurcations 30, 31 of the levers 24.

The bin 10 is supported on four posts 32 reinforced by braces 34. The posts also carry a pair of upper rails 36 and a pair of lower rails 38. On the upper rails rides a carriage or car 39 including a flat bed platform 40 having flanged wheels 41 engaged on the rails 36. Pivotally attached to the platform 40 is a cart body 44. This cart body is generally rectangular in form and has a forward sloping wall formed with a discharge spout 48. Attached to a rear axle of the platform 40 is a hook 50 to which is attached a cable 52. This cable is entrained over a pulley 54 rotatably carried by the upper rails, and another pulley 56 carried by brackets 58 on the lower rails. The cable has its other end secured on an eye bar 60 attached to a counterweight 62. This counterweight is made of some permanent magnetic material such as iron.

The counterweight 62 is mounted on flanged wheels 64 engaged to rotate on rails 38. The rails 36 and 38 incline downwards from an upper position on posts 32 to a lower position on a pair of posts 66. Posts 66 along with another pair of posts 68 support a double hopper 70. This hopper has two spaced rectangular openings 72, 74 so that material discharged into the hopper for loading a truck T disposed beneath the hopper, will be equally loaded on both sides of the truck.

Near the lower ends of the rails is secured a stop plate 76 to which are attached springs 78 carrying an electromagnet 80 adapted when suitably energized to attract and hold the counterweight 62 in the position shown in Figs. 1 and 2. At the top of the counterweight is a recess 82. A hook 84 pivotally mounted in a casing 86 underneath rails 36 is disposed for engagement in recess 82 to hold the counterweight in the position shown in Fig. 3. Under certain conditions, as when the cart 44 is loaded with material or is discharging material into hopper 70, the counterweight may be held in the position shown in Fig. 3 solely by the combined weight of the carriage 39 and the material therein.

A counterweight stop including a bar 88 supported by springs 89 on a base 90 is supported near the upper end of the lower rails 38. A movable platform 92 set in the ground G is provided under hopper 70 upon which the truck T is disposed while being loaded. Platform 92, as best shown in Fig. 5, includes an upper rectangular plate 94 provided with a depending skirt 95. The plate is movably supported by springs 98 on a base plate 100. Plate 94 carries an insulator 102. Attached to the insulator is a metal post 104 which has an outwardly extending metallic finger 106. This finger is normally out of contact with a resistance bar 108 mounted on base 100. Bar 108 and finger 106 are connected in an electrical circuit as best shown in Fig. 4.

Referring to Fig. 4, it will be noted that there is provided a battery 110 conected via a variable resistor 112 to a coil 114 of electromagnet 80. Coil 114 is in series with resistance bar 108 and contact finger 106. The battery is also in circuit with the coil 116 of a solenoid 118. An armature 119 is mounted on the end of hook 84. The solenoid is disposed in casing 86 shown in Figs. 1 and 3. In series with coil 116 is a push button switch 120 and a resistor 122 carried in a switch box 124. The switch box is mounted on posts 66 at such a height that the outwardly projecting button 126 can be closed by the body of truck T when it enters upon platform 92 as shown in Fig. 1. Variable resistor 112 is also mounted on posts 66 for manual actuation. Electric cables 73, 75 and 77 interconnect the various components of the electrical circuits of the apparatus.

In explanation of operation of the apparatus, the truck T will be assumed as having entered upon the platform 92 and been filled with a load L of material dispensed from bin 10, as shown in Fig. 3. The cart body 44 is pivoted forwardly over bar 67 so that spout 48 opens into hopper 70. Hook 84 is engaged in recess 82 in the counterweight and prevents the counterweight from traveling down rails 38. It will be noted that the truck body is out of contact with the button 126 of the push button switch 120 because the weight of the loaded truck depresses the platform plate 94. The floor plate 18 of the bin 10 is held closed by springs 19 engaged between plate pins 28 and the sides of the bin.

It will now be assumed that the loaded truck T shown in Fig. 3 drives off of platform 92. The cart body 44 may remain in the upset position shown in Fig. 3 or the springs 43 may be arranged to retract the cart body on to the platform 40 when the cart body is empty. The carriage 39 remains at the lower end of rails 36 while the counterweight is held by hook 84 at the upper end of rails 38. If an empty truck T enters on the platform 92 as shown in Fig. 1, it will only partially depress the platform plate 94. As the truck backs onto the platform plate 94, its body contacts the button 126 which closes the circuit of solenoid 118 and actuates hook 84 to release the counterweight. The counterweight will be released and will roll down rails 38 while the carriage 39 will be drawn up rails 36.

If the cart body has not been previously retracted, its spout 48 will pass bar 67 and in doing so the cart body will be tilted backward onto platform 40. The carriage 39 will now ride up to bin 10 and pivot lever 26 to open floor plate 18 so that the material stored in the bin can fill the cart body 44. The counterweight, which has meanwhile traveled down the rails 38 is stopped by the electromagnet bar 80. The electromagnet has become energized because when the truck T enters upon platform 92 it lowers the finger 106 sufficiently to contact resistor bar 108 and close the electromagnet circuit. The counterweight is held against the magnet due to its gravitational weight in addition to the magnetic force of attraction. When the cart body 44 has been sufficiently filled with material to be loaded in truck T, its weight overcomes the weight of the counterweight plus the magnetic hold of the electromagnet and the loaded cart travels down rails 36. The cart platform strikes the bar 67 and the cart body due to its inertia and high center of gravity pivots over the bar to empty the contents of the cart body into the hopper 70 and the truck disposed beneath it. The bar 67 may be provided with a shock absorber pad 69 to cushion it, if desired.

As the material emptied by the cart body passes into the truck, the truck body is further lowered on platform 92 due to its increasing weight. This releases button 126 and opens the solenoid actuation circuit so that the hook 84 is released and in position to reengage the counterweight when it next returns to the top end of rails 38.

When the cart body leaves bin 10, it pivots the lever 24 to close the floor plate 18. This closure action is assisted by springs 19. The variable resistor 112 mounted on posts 66 provide a means for adjusting the current flowing through electromagnet coil 114 and thus varying the force with which the counterweight is restrained while the cart body is being filled.

An automatic control of the amount of material to be discharged into the cart body is provided by resistor bar 108 and finger 106. When a larger and heavier truck with greater carrying capacity enters on platform 92 it will depress the plate 94 more than will a smaller and lighter truck. Thus, the effective resistance of bar 108 in circuit with coil 114 will be less with a larger and heavier truck than with a smaller and lighter one. The smaller resistance of bar 108 permits a larger magnetizing current to flow through coil 114 so that the counterweight is held with greater magnetic force and the cart body 44 must be loaded with more material for the larger truck than for the smaller one. Regardless of whether a light or heavy truck is used, the switch box 124 will be positioned so that switch 120 will always be actuated by the truck in an empty and unloaded condition and will be released while the truck is being loaded as the truck being loaded further depresses platform plate 94.

When the truck has been loaded, the cart body is again in the position shown in Fig. 3 with hook 84 engaged in the recess 82 of the counterweight. During the short time that the truck body holds switch 120 closed, the hook 84 remains retracted. However, the weight of material in the cart body holds the counterweight at the top of rails 38 and prevents it from traveling down the rails. During the unloading of the material from the cart body, the solenoid circuit is opened and the hook is released to take hold on the counterweight as explained above. When the truck T leaves platform 92, the electromagnet 80 circuit is opened as springs 98 elevate platform plate 94 and separate finger 106 and bar 108.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A conveyor and loading device, comprising a bin for storing material, inclined rails, a cart supported on said rails, said cart including a bed and a body, said body being pivotally attached to said bed, said rails having an upper end terminating near said bin for discharge of said material into the cart body, a hopper disposed near a lower end of the rails for receiving said material from the cart body, other inclined rails spaced from the first-named rails, a counterweight disposed for movement on the other rails, and a cable connecting the cart and counterweight, whereby the cart body is loaded with said material when the cart is near the upper end of the first-named rails while the counterweight is near a lower end of the other rails, and whereby the cart body is unloaded into said hopper when the cart body is located at the lower end of the first-named rails while the counterweight is near an upper end of the other rails, means for supplementing the weight of the counterweight to hold the cart near the upper end of the first-named rails, for filling, with said material, from the bin, said means being an electromagnet located near the lower end of said other rails and disposed to engage said counterweight by force of magnetic attraction.

2. A conveyor and loading device, comprising a bin for storing material, inclined rails, a cart supported on said rails, said cart including a bed and a body, said body being pivotally attached to said bed, said rails having an upper end terminating near said bin for discharge of said material into the cart body, a hopper disposed near a lower end of the rails for receiving said material from the cart body, other inclined rails spaced from the first-named rails, a counterweight disposed for movement on the other rails, and a cable connecting the cart and counterweight, whereby the cart body is loaded with said material when the cart is near the upper end of the first-named rails while the counterweight is near a lower end of the other rails, and whereby the cart body is unloaded into said hopper when the cart body is located at the lower end of the first-named rails while the counterweight is near an upper end of the other rails, means for supplementing the weight of the counterweight to hold the cart near the upper end of the first-named rails, for filling, with said material, from the bin, said means being an electromagnet located near the lower end of said other rails and disposed to engage said counterweight by force of magnetic attraction, a platform for supporting a vehicle to receive the material from said cart body located below said hopper, a circuit serving said electromagnet and a triggering switch in said circuit reactive to engagement by the vehicle moving to filling position onto the platform.

3. A conveyor and loading device, comprising a bin for storing material, inclined rails, a cart supported on said rails, said cart including a bed and a body, said body being pivotally attached to said bed, said rails having an upper end terminating near said bin for discharge of said material into the cart body, a hopper disposed near a lower end of the rails for receiving said material from the cart body, other inclined rails spaced from the first-named rails, a counterweight disposed for movement on the other rails, and a cable connecting the cart and counterweight, whereby the cart body is loaded with said material when the cart is near the upper end of the first-named rails while the counterweight is near a lower end of the other rails, and whereby the cart body is unloaded into said hopper when the cart body is located at the lower end of the first-named rails while the counterweight is near an upper end of the other rails, means for supplementing the weight of the counterweight to hold the cart near the upper end of the first-named rails, for filling, with said material, from the bin, said means being an electromagnet located near the lower end of said other rails and disposed to engage said counterweight by force of magnetic attraction, a platform for supporting a vehicle to receive the material from said cart body located below said hopper, a circuit serving said electromagnet and a triggering switch in said circuit reactive to engagement by the vehicle moving to filling position onto the platform, said circuit including a resistance element and movable contact adapted to selectively limit the amount of current flowing in said circuit, and reactive to the weight of said vehicle resting on said platform.

4. A conveyor and loading device, comprising a bin for storing material, inclined rails, a cart supported on said rails, said cart including a bed and a body, said body being pivotally attached to said bed, said rails having an upper end terminating near said bin for discharge of said material into the cart body, a hopper disposed near a lower end of the rails for receiving said material from the cart body, other inclined rails spaced from the first-named rails, a counterweight disposed for movement on the other rails, and a cable connecting the cart and counterweight, whereby the cart body is loaded with said material when the cart is near the upper end of the first-named rails while the counterweight is near a lower end of the other rails, and whereby the cart body is unloaded into said hopper when the cart body is located at the lower end of the first-named rails while the counterweight is near an upper end of the other rails, means for supplementing the weight of the counterweight to hold the cart near the upper end of the first-named rails for filling with said material from the bin, and further means for holding the counterweight at the upper end of said other rails when the cart body is empty, said further means including an electrically operable locking means, said locking means including a pivoted hook adapted to hook onto said counterweight and being solenoid operated and in circuit with a switch, said switch being located below said hopper for actuation by a vehicle to be loaded with material discharged from the cart body to release the counterweight.

5. A conveyor and loading device, comprising a bin for storing material, inclined rails, a cart supported on said rails, said cart including a bed and a body, said body being pivotally attached to said bed, said rails having an upper end terminatnig near said bin for discharge of said material into the cart body, a hopper disposed near a lower end of the rails for receiving said material from the cart body, other inclined rails spaced from the first-named rails, a counterweight disposed for movement on the other rails, and a cable connecting the cart and counterweight, whereby the cart body is loaded with said material when the cart is near the upper end of the first-named rails while the counterweight is near a lower end of the other rails, and whereby the cart body is unloaded into said hopper when the cart body is located at the lower end of the first-named rails while the counterweight is near an upper end of the other rails, means for supplementing the weight of the counterweight to hold the cart near the upper end of the first-named rails, for filling, with said material, from the bin, said means being an electromagnet located near the lower end of said other rails and disposed to engage said counterweight by force of magnetic attraction, a platform for supporting a vehicle to receive the material from said cart body located below said hopper, a circuit serving said electromagnet and a triggering switch in said circuit reactive to engagement by the vehicle moving to filling position onto the platform, said circuit including a resistance element and movable contact adapted to selectively limit the amount of current flowing in said circuit, and reactive to the weight of said vehicle resting on said platform, and further means for holding the counterweight at the upper end of said other rails when the cart body is empty.

6. A conveyor and loading device, comprising a bin for storing material, inclined rails, a cart supported on said rails, said cart including a bed and a body, said body being pivotally attached to said bed, said rails having an upper end terminating near said bin for discharge of said material into the cart body, a hopper disposed near a lower end of the rails for receiving said material from the cart body, other inclined rails spaced from the first-named rails, a counterweight disposed for movement on the other rails, and a cable connecting the cart and counterweight, whereby the cart body is loaded with said material when the cart is near the upper end of the first-named rails while the counterweight is near a lower end of the other rails, and whereby the cart body is unloaded into said hopper when the cart body is located at the lower end of the first-named rails while the counterweight is near an upper end of the other rails, means for supplementing the weight of the counterweight to hold the cart near the upper end of the first-named rails, for filling, with said material, from the bin, said means being an electromagnet located near the lower end of said other rails and disposed to engage said counterweight by force of magnetic attraction, a platform for supporting a vehicle to receive the material from said cart body located below said hopper, a circuit serving said electromagnet and a triggering switch in said circuit reactive to engagement by the vehicle moving to filling position onto the platform, said circuit including a resistance element and movable contact adapted to selectively limit the amount of current flowing in said circuit, and reactive to the weight of said vehicle resting on said platform, and further means for holding the counterweight at the upper end of said other rails when the cart body is empty, said further means being a solenoid operated catch member, said solenoid being in circuit with a switch, said switch being located below said hopper for actuation by said vehicle when in an empty condition, said switch being released by the vehicle when in a loaded condition.

7. A conveyor and loading device, comprising a bin for storing material, inclined rails, a cart supported on said rails, said cart including a bed and a body, said body being pivotally attached to said bed, said rails having an upper end terminating near said bin for discharge of said material into the cart body, a hopper disposed near a lower end of the rails for receiving said material from the cart body, other inclined rails spaced from the first-named rails, a counterweight disposed for movement on the other rails, and a cable connecting the cart and counterweight, whereby the cart body is loaded with said material when the cart is near the upper end of the first-named rails while the counterweight is near a lower end of the other rails, and whereby the cart body is unloaded into said hopper when the cart body is located at the lower end of the first-named rails while the counterweight is near an upper end of the other rails, means for supplementing the weight of the counterweight to hold the cart near the upper end of the first-named rails, for filling, with said material, from the bin, said means being an electromagnet located near the lower end of said other rails and disposed to engage said counterweight by force of magnetic attraction, a platform for supporting a vehicle to receive the material from said cart body located below said hopper, a circuit serving said electromagnet and a triggering switch in said circuit reactive to engagement by the vehicle moving to filling position onto the platform, said circuit including a resistance element and movable contact adapted to selectively limit the amount of current flowing in said circuit, and reactive to the weight of said vehicle resting on said platform, there being further means for holding the counterweight at the upper end of said other rails when the cart body is empty, and a manually operable variable resistor in circuit with said electromagnet for setting the filling point at which the cart moves away from said bin.

References Cited in the file of this patent

UNITED STATES PATENTS

| | | |
|---|---|---|
| 995,546 | Martin et al. | June 20, 1911 |
| 1,251,117 | Savage | Dec. 25, 1917 |
| 2,633,253 | Martin | Mar. 31, 1953 |